United States Patent [19]

Hiroyuki et al.

[11] Patent Number: 4,693,990

[45] Date of Patent: Sep. 15, 1987

[54] PRODUCTION OF CATALYST COMPONENT FOR OLEFIN POLYMERIZATION

[75] Inventors: Furuhashi Hiroyuki; Tadashi Yamamoto; Masafumi Imai; Hiroshi Ueno, all of Saitama, Japan

[73] Assignee: Toa Nenryo Kogyo Kabushiki Kaisha, Toyko, Japan

[21] Appl. No.: 882,042

[22] Filed: Jul. 3, 1986

[30] Foreign Application Priority Data

Jul. 5, 1985 [JP] Japan ................................ 60-146805

[51] Int. Cl.$^4$ ................................ C80F 4/64
[52] U.S. Cl. ................................ 502/116; 502/115; 502/118; 502/120; 502/121; 502/122; 502/123; 502/124; 502/125; 502/126; 502/127; 526/128; 526/129; 526/143
[58] Field of Search ............... 502/115, 116, 118, 120, 502/121, 122, 123, 124, 125, 126, 127

[56] References Cited

U.S. PATENT DOCUMENTS

| 4,335,816 | 6/1982 | Dombro | 502/116 X |
|---|---|---|---|
| 4,394,292 | 7/1983 | Yamada et al. | 502/115 |
| 4,530,913 | 7/1985 | Pullukat et al. | 502/125 X |
| 4,613,579 | 9/1986 | Furohashi et al. | 502/115 |

FOREIGN PATENT DOCUMENTS 61-21109 1/1986 Japan.

Primary Examiner—Patrick P. Garvin
Attorney, Agent, or Firm—M. B. Kurtzman

[57] ABSTRACT

A titamium containing catalyst component for olefin polymerizations which comprises contacting (a) a metal oxide, (b) a dihydrocarbyl magnesium, and (c) a hydrocarbyloxy group-containing compound with one another, contacting the thus obtained contact product with (d) a halogen-containing alcohol, and finally contacting the thus obtained contact product with (e) an electron donor compound and (f) a titanium compound.

19 Claims, No Drawings

PRODUCTION OF CATALYST COMPONENT FOR OLEFIN POLYMERIZATION

DETAILED DESCRIPTION OF THE INVENTION

1. Field of Industrial Application

The present invention relates to a titanium-containing catalyst component, its process of production, an olefin polymerization process employing as a catalyst component the titanium-containing catalyst component, and a precursor component employed in produciong the titanium-containing catalyst component.

2. Prior Art

Heretofore, there have been proposed several Ziegler-Natta catalysts for olefin polymerization in which a metal oxide such as silica and alumina is used as a carrier. Most of them are designed for ethylene polymerization.

The proposals include, for example, a catalyst component which is prepared by reacting a porous carrier such as silica with an alkyl magnesium compound, reacting the reaction product with a hydrocarbyloxysilane, and further reacting the reaction product with a titanium halide compound (U.S. Pat. No. 4,335,016); and a catalyst component which is prepared by reacting a porous carrier with an organometallic compound, reacting the reaction product with water or a hydrocarbyl alcohol, and further reacting the reaction product with a titanium halide compound (U.S. Pat. No. 4,378,304 and U.S. Pat. No. 4,458,058). Unfortunately, these catalyst components are not suitable for the polymerization of alpha-olefins such as propylene.

On the other hand, there are some known catalyst components for the polymerization of propylene. They include, for example, one which is prepared by reacting a metal oxide with a magnesium dialkoxide, and then contacting the reaction product with an electron donor compound and a titanium (IV) halide (Japanese Patent Laid-open No. 162607/1983); one which is prepared by reacting an inorganic oxide with a magnesium hydrocarbyl halide compound, and contacting the reaction product with a Lewis base compound and titanium tetrachloride (U.S. Pat. No. 4,263,168 and U.S. Pat. No. 4,329,252). These catalyst components, however, are not satisfactory with regard to activity and stereoregularity.

Problems to be solved by the invention

It is an object of the present invention to provide a catalyst component supported on a metal oxide which exhibits high activity and high stereoregularity when used for homopolymerization of an olefin, especially alpha-olefin such as propylene, and copolymerization of such an olefin with other olefins.

The present inventors previously found a catalyst component which exhibits outstanding catalytic performance in the (co)polymerization of alpha-olefins. (Japanese Publication No. J61021109-A) It is prepared by contacting (a) a metal oxide, (b) a dihydrocarbyl magnesium, and (c) a halogen-containing alcohol with one another, and then contacting the reaction product with (d) an electron donor compound and (e) a titanium compound. In order to improve the performance of the catalyst component, the present inventors carried out extensive studies which led to the present invention.

Means to solve the problem

SUMMARY OF THE INVENTION

The gist of the present invention resides in a catalyst component for olefin polymerization which comprises contacting (A) a metal oxide, (B) a dihydrocarbyl magnesium, and (C) a hydrocarbyloxy group-containing compound with one another, contacting the thus obtained contact product with (D) a halogen-containing alcohol, and finally contacting the thus obtained contact product with (E) an electron donor compound and (F) a titanium compound its process of production and the precursor comprising the contact procuct of (A), (B) and (C).

Raw materials for preparing the catalyst component

(A) Metal oxide

The metal oxide used in this invention is an oxide of a metal selected from the group of elements in Groups II to IV of the Periodic Table. It includes, for example, $B_2O_3$, $MgO$, $Al_2O_3$, $SiO_2$, $CaO$, $TiO_2$, $ZnO$, $ZrO_2$, $BaO$, and $ThO_2$. Preferable among them are $B_2O_3$, $MgO$, $Al_2O_3$, $SiO_2$, $TiO_2$, and $ZrO_2$. Especially preferable is $SiO_2$. Additional examples of the metal oxides are complex oxides containing these metal oxides, such as $SiO_2$-$MgO$, $SiO_2$-$TiO_2$, $SiO_2$-$V_2O_5$, $SiO_2$-$Cr_2O_3$, and $SiO_2$-$TiO_2$-$MgO$.

Fundamentally, the above-mentioned metal oxides and complex oxides should preferably be anhydrous. However, they may contain a very small amount of hydroxide which is usually present. In addition, they may contain impurities in such an amount that they do not considerably impair the properties of the metal oxides. The permissible impurities are oxides, carbonates, sulfates, and nitrates such as sodium oxide, potassium oxide, lithium oxide, sodium carbonate, potassium carbonate, calcium carbonate, magnesium carbonate, sodium sulfate, aluminum sulfate, barium sulfate, potassium nitrate, magnesium nitrate, and aluminum nitrate.

Usually these metal oxides are used in the form of powder. The particle size and shape of the powder should be properly adjusted because they affect the form of the resulting olefin polymer. In addition, the metal oxide should preferably be calcined, prior to use, at as high a temperature as possible to remove poisonous substances, and the calcined metal oxide should be isolated from the atmosphere during handling.

(B) Dihydrocarbyl magnesium

The dihydrocarbyl magnesium (referred to as organo-Mg hereinafter) used in this invention is represented by the formula RMgR', wherein R and R' are the same or different alkyl, cycloalkyl, aryl, and aralkyl groups having 1 to 20 carbon atoms.

Examples of the organo-Mg are dimethyl magnesium (magnesium is abbreviated as Mg hereinafter), diethyl Mg, ethylmethyl Mg, dipropyl Mg, diisopropyl Mg, ethyl propyl Mg, dibutyl Mg, diisobutyl Mg, di-sec-butyl Mg, di-tert-butyl Mg, butyl ethyl Mg, butyl propyl Mg, sec-butyl ethyl Mg, tert-butyl isopropyl Mg, sec-butyl tert-butyl Mg, dipentyl Mg, diisopentyl Mg, ethyl pentyl Mg, isopropyl pentyl Mg, sec-butyl pentyl Mg, dihexyl Mg, ethyl hexyl Mg, butyl hexyl Mg, tert-butyl hexyl Mg, (2-ethybutyl) ethyl Mg, (2,2-diethylbutyl) ethyl Mg, diheptyl Mg, dioctyl Mg, di-2-ethylhexyl Mg, di(methylcylohexyl) Mg, diphenyl Mg, ethyl phenyl Mg, butyl phenyl Mg, sec-butyl phenyl Mg, ditolyl Mg, ethyl tolyl Mg, dixylyl Mg, dibenzyl Mg, benzyl tert-butyl Mg, diphenetyl Mg, and ethyl phenetyl Mg.

These organo-Mg compounds may be used in the form of a mixture or complex compound with an organic compound of other metals which is represented by the formula $MR_n$ (where M denotes boron, beryllium, aluminum, or zinc; R denotes an alkyl, cycloalkyl, aryl, or aralkyl group having 1 to 20 carbon atoms; and n denotes the valence of the metal M). Their examples include triethyl aluminum, tributyl aluminum, triisobutyl aluminum, triphenyl aluminum, triethyl boron, tributyl boron, diethyl beryllium, diiobutyl beryllium, diethyl zinc, and dibutyl zinc.

Where the organo-Mg is used in the form of a mixture or complex compound with an organic compound of other metals, the amount of other metals is usually less than 5 gram atom, preferably less than 2 gram atom, for 1 gram atom of magnesium.

(C) Hydrocarbyloxy group-containing compound

The hydrocarbyloxy group-containing compound used in this invention is represented by the formula $R''_q Mm(OR''')_n$ (where $R''$ denotes a hydrogen atom or a hydrocarbyl group having 1 to 20 carbon atoms; M denotes a silicon, carbon, phosphorous, boron, or aluminum atom; $R'''$ denotes a hydrocarbyl group having 1 to 20 carbon atoms; and $m > q \geq 0$, $m \geq n > 0$, and m denotes the valence of M).

Examples of the hydrocarbyl group include alkyl groups such as methyl, ethyl, propyl, i-propyl, butyl, amyl, hexyl, octyl, 2-ethylhexyl, and decyl groups, cycloalkyl groups such as cyclopentyl, cyclohexyl, and methylcylcohexyl groups; alkenyl groups such as allyl, propenyl, and butenyl groups; aryl groups such as phenyl, tolyl, and xylyl groups; and aralkyl groups such as phenetyl and 3-phenylpropyl groups. Preferably among them are alkyl groups having 1 to 10 carbon atoms. $R''$ and $R'''$ may be the same or different.

Examples of these compounds are as follows: Compounds represented by the formula $Si(OR''')_4$ such as $Si(OCH_3)_4$, $Si(OC_2H_5)_4$, $Si(OC_4H_9)_4H_9)_4$, $Si(Oi-C_4H_9)_4$, $Si(OC_6H_{13})_4$, $Si(OC_8H_{17})_4$, $Si[OCH_2CH(C_2H_5)C_4H_9]_4$, and $Si(OC_6H_5)_4$, compounds represented by the formula $R''Si(OR''')_3$ such as $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, and $C_2H_5Si(OC_6H_5)_3$, compounds represented by the formula $R''_2Si(OR''')_2$ such as $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, and $(C_6H_5)_2Si(OC_2H_5)_2$; compounds represented by the formula $R''_3SiOR'''$ such as $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$, and $(C_6H_5)_3Si-OC_2H_5$; compounds represented by the formula $C(OR''')_4$ such as $C(OCH_3)_4$, $C(OC_2H_5)_4$, $C(OC_4H_9)_4$, $C(OC_6H_{13})_4$, $C(OC_8H_{17})_4$, and $C(OC_6H_5)_4$; compounds represented by the formula $R''C(OR''')_3$ such as $HC(OCH_3)_3$, $HC(OC_2H_5)_3$, $HC(OC_3H_7)_3$, $HC(OC_4H_9)_3$, $HC(OC_6H_{13})_3$, $HC(OC_8H_{17})_3$, $HC(OC_6H_5)_3$, $CH_3C(OCH_3)_3$, $CH_3C(OC_2H_5)_3$, and $C_2H_5C(OC_2H_5)_3$; compounds represented by the formula $R''_2C(OR''')_2$ such as $CH_3CH(OCH_3)_2$, $CH_3CH(OC_2H_5)_2$, $CH_2(OCH_3)_2$, $CH_2(OC_2H_5_2)$, and $C_6H_5CH(OC_2H_5)_2$; compounds represented by the formula $P(OR''')_3$ such as $P(OCH_3)_3$, $P(OC_2H_5)_3$, $P(OC_4H_9)_3$, $P(OC_6H_{13})_3$, and $P(OC_6H_5)_3$; compounds represented by the formula $B(OR''')_3$, such as $B(OC_2H_5)_3$, $B(OC_4H_9)_3$, $B(OC_6H_{13})_3$, and $B(OC_6H_5)_3$; and compounds represented by the formula $Al(OR''')_3$, such as $Al(OCH_3)_3$, $Al(OC_2H_5)_3$, $Al(OCH_3H_7)_3$, $Al(Oi-C_3H_7)_3$, $Al(OC_4H_9)_3$, $Al(Ot-C_4H_9)_3$, $Al(OC_6H_{13})_3$, and $Al(OC_6H_5)_3$.

(D) Halogen-containing alcohol

The halogen-containing alcohol used in this invention is a monohydric alcohol having one hydroxyl group in one molecule or a polyhydric alcohol having two or more hydroxyl groups in one molecule, with one or more arbitrary hydrogen atoms other than that of the hydroxyl group replaced by halogen atoms. The halogen atoms are chlorine, bromine, iodine, and fluorine atoms, chlorine atoms being preferable.

Examples of the halogen-containing compound include 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1, 2-propanediol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3, 5-dimethylphenol, chlorohydroquinone, 2-benzyl-4-chlorophenol, 4-chloro-1-naphthol, (m,o,p)-chlorophenol, p-chloro-alpha-methylbenzyl alcohol, 2-chloro-4-phenylphenol, 6-chlorothymol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcin, (m,o,p)-fluorophenol, p-iodophenol, 2,2-dichloroethanol, 2,3-dichloro-1-propanol, 1,3-dichloro-2-propanol, 3-chloro-1-(alpha-chloromethyl)-1-propanol, 2,3-dibromo-1-propanol, 1,3-dibromo-2-propanol, 2,4-dibromophenol, 2,4-dibromo-1-naphthol, 2,2,2-trichloroethanol, 1,1,1-trichloro-2-propanol, $\beta,\beta,\beta$-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, alpha,alpha,alpha-trifluoro-m-cresol, 2,4,6-triiodophenol, 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol, and tetrafluororesorcin.

(E) Electron donor compound

The electron donor compound includes carboxylic acids, carboxylic acid anhydrides, carboxylic acid esters, carboxylic acid halides, alcohols, ethers, ketones, amines, amides, nitriles, aldeydes, alcoholates, phosphamides, thioethers, thioesters, carbonic acid esters, and compounds of phosphorus, arsenic, or antimony attached to an organic group through a carbon or oxygen atom. Preferable among them are carboxylic acids, carboxylic acid anhydrides, carboxylic acid esters, carboxylic acid halides, alcohols, and ethers.

Examples of the carboxylic acids include aliphatic monocarboxylic acids such as formic acid, acetic acid, propionic acid, buryric acid, isobutyric acid, valeric acid, caproic acid, pivalic acid, acrylic acid, methacrylic acid, and crotonic acid; aliphatic dicarboxylic acids such as malonic acid, succinic acid, glutaric acid, adipic acid, sebacic acid, maleic acid, and fumaric acid; aliphatic hydroxycarboxylic acids such as tartaric acid; alicyclic carboxylic acids such as cyclohexane monocarboxylic acid, cyclohexene monocarboxylic acid, cis-1,2-cyclohexane dicarboxylic acid, and cis-4-methylcylohexene-2,2-dicarboxylic acid; aromatic monocarboxylic acids such as benzoic acid, toluic acid, anisic acid, p-tertiarybutylbenzoic acid, naphthoic acid, and cinnamic acid; and aromatic polycarboxylic acids such as phthalic acid, isophthalic acid, terephthalic acid, naphthalic acid, trimellitic acid, hemimellitic acid, trimesic acid, pyromellitic acid, and mellitic acid.

The carboxylic acid anhydrides that can be used in this invention are the above-mentioned carboxylic acids in the form of anhydride.

The carboxylic acid esters that can be used in this invention are monoesters and polyesters of the above-mentioned carboxylic acids. Their examples include butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexane-carbonate, methyl benzoate, ethyl benzoate, methyl p-toluylate, ethyl p-tertiary-butylbenzoate, ethyl p-anisate, ethyl alpha-naphthoate, isobutyl alpha-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diaryl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, bributyl trimellitate, tetramethyl pyrotrimellitate, tetraethyl pyrotrimellitate, and tetrabutyl pyromellitate.

The carboxylic acid halides that can be used in this invention are acid halides of the above-mentioned carboxylic acids. Their examples include acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, malonic acid chloride, malonic acid bromide, succinic acid chloride, succinic acid bromide, glutaric acid chloride, glutatric acid bromide, adipic acid chloride, adipic acid bromide, sebacic acid chloride, sebacic acid bromide, maleic acid chloride, maleic acid bromide, fumaric acid chloride, fumaric acid bromide. tartaric acid chloride, tartaric acid bromide, cyclohexane carboxylic acid chloride, cyclohexane carboxylic acid bromide, 1-cyclohexene carboxylic acid chloride, cis-4-methylcylohexene carboxylic acid chloride, cis-4-methylcylohexene carboxylic acid bromide, benzoyl bromide, benzoyl bromide, p-toluic acid chloride, p-toluic acid bromide, p-anisic acid chloride, p-anisic acid bromide, alpha-naphthoic acid chloride, cinnamic acid chloride, cinnamic acid bromide, phthalic acid dichloride, phthalic acid dibromide, isphthalic acid dichloride, isophthalic acid dibromide, terephthalic acid dichloride, and naphthalic acid dichloride. Additional useful compounds include dicarboxylic acid monoalkylhalides such as adipic acid monomethylchloride, maleic acid monoethylchloride, maleic acid monomethylchloride, and phthalic acid butyl-chloride.

The alcohols are those compounds represented by the formula ROH, where R is an alkyl, alkenyl, cycloalkyl, aryl, or aralkyl group having 1 to 12 carbon atoms. Examples of the alcohols include methanol, ethanol, propanol, isopropanol, butanol, isobutanol, pentanol, hexanol, octanol, 2-thylhexanol, cyclohexanol, benzyl alcohol, allyl alcohol, phenol, cresol, xylenol, ethylphenol, isopropylphenol, p-tert-butylphenol, and n-octylphenol.

The ethers are those compounds represented by the formula ROR', where R and R' are alkyl, alkenyl, cycloalkyl, aryyl, or aralkyl groups each having 1 to 12 carbon atoms. R and R' may be the same or different. Examples of the ethers include diethyl ether, diisopropyl ether, dibutyl ether, diisobutyl either, diisoamyl ether, di-2-ethylhexyl ether, diallyl ether, ethylallyl ether, butylallyl ether, diphenyl ether, anisole, and ethylphenyl ether. Any one of the above-mentioned halogen-containing alcohols can be used as an electron donor compound.

(F) Titanium compound

The titanium compound is a compound of divalent, trivalent, or tetravalent titanium. Their examples include titanium tetrachloride, titanium tetrabromide, trichloroethoxytitanium, trichlorobutoxytitanium, dichlorodiethyoxytitanium, dichlorodibutoxytitanium, dichlorodiphenoxytitanium, chlorotriethoxytitanium, chlorotributoxytitanium, tetrabutoxytitanium, and titanium trichloride. Preferable among them are tetravalent titanium halides such as titanium tetrachloride, trichloroethoxytitanium, dichlorodibutoxytitanium, and dichlorodiphenoxytitanium. Particularly preferable is titanium tetrachloride.

Preparation of catalyst component

The preparation of the catalyst component of this invention involves the steps of contacting a metal oxide (component A), an organo-Mg (component B), and a hydrocarbyloxy group-containing compound (component C) with one another, contacting the resulting contact product with a halogen-containing alcohol (component D), and further contacting the resulting contact product with an electron donor compound (component E) and a titanium compound (compound F).

Contacting components A, B, and C with one another

Components A, B, and C can be contacted with one another in the following four manners.

(1) Component A and component B are contacted with each other and the resulting contact product is contacted with component C.

(2) Component A and component C are contacted with each other and the resulting contact product is contacted with component B.

(3) Component B and component C are contacted with each other and the resulting contact product is contacted with component A.

(4) Component A, component B, and component C are contacted with one another simultaneously.

The above-mentioned contacting may be accomplished by mixing and stirring or mechanically copulverizing the three components in the presence or absence of an inert medium. Examples of the inert medium include hydrocarbons such as pentane, hexane, heptane, octane, decane, cyclohexane, benzene, toluene, and xylene; and halogenated hydrocarbons such as 1,2- dichloroethane, 1,2-dichloropropane, carbon tetrachloride, butyl chloride, isoamyl chloride, bromobenzene, and chlorotoluene.

Usually the contacting of components A, B, and C with one another is performed at −20° C. to +150° C. for 0.1 to 100 hours. Where the contacting involves heat generation, contacting may be performed in such a manner that the components are mixed little by little at a low temperature in the initial stage, and after the mixing of the entire components is complete, the temperature is increased and contacting is continued. At the interval between contacting steps, the contact product may be washed with one of the above-mentioned inert media; however, in the case of the above-mentioned first and second methods, it is preferable not to wash the contact product of the first two components before it is contacted with the third component. A preferred molar ratio of components A, B, and C is B/A=0.01 to 10, C/A=0.01 to 10, and C/B=0.1 to 10.

The contacting of components A, B, and C produces a solid product (referred to as reaction product I hereinafter). If necessary, it may be washed with a proper cleaning agent, e.g., one of the above-mentioned inert media, before it undergoes the subsequent contacting steps.

Contacting of reaction product I with component D

The contacting may be accomplished by mixing and stirring or mechanically copulverizing them in the presence or absence of an inert medium. Contacting should preferably be accomplished by mixing and stirring in the presence of an inert medium. One of the inert media used in the above-mentioned contacting of components A, B, and C may also be used.

Usually the contacting of reaction product I with component D (the halogen-containing alcohol) is performed at −20° C. to +150° C. for 0.1 to 100 hours. Where the contacting involves heat generation, contacting may be performed in such a manner that the components are mixed little by little at a low temperature in the initial stage, and after the mixing of all the components is complete, the temperature is increased and contacting is continued. A preferred molar ratio of component D to component B in reaction product I is 0.1 to 20, preferably 0.5 to 10.

The contacting of reaction product I with component D produces a solid product (referred to as reaction product II hereinafter). If necessary, it may be washed with a proper cleaning agent, e.g., one of the above-mentioned inert media, before it undergoes the subsequent contacting steps.

Contacting of reaction product II with components E and F

Reaction product II is contacted with an electron donor compound (component E) and a titanium compound (compound F) in the following three manners.

(1) Reaction product II and component E are contacted with each other and the resulting contact product is contacted with component F.
(2) Reaction product II and component F are contacted with each other and the resulting contact product is contacted with component E.
(4) Reaction product II, component E, and component F are contacted with one another simultaneously.

The above-mentioned contacting may be accomplished by mixing and stirring or mechanically copulverizing the three components in the presence or absence of an inert medium. Contacting by mixing and stirring in the presence or absence of an inert medium is preferable. Any one of the above-mentioned inert media can be used.

Usually the contacting of reaction product II with components E and F is performed at 0° C. to 200° C. for 0.1 to 100 hours in the case of mechanical copulverization, and 0° C. to 200° C. for 0.5 to 20 hours in the case of mixing and stirring.

The amount of component E is 0.005 to 10 gram mol, preferably 0.01 to 1 gram mol, for 1 gram atom of magnesium in reaction product II. The amount of component F is 0.1 gram mol and above, preferably 1 to 50 gram mol, for 1 gram atom of magnesium in reaction product II.

The contacting of reaction product II with component F may be accomplished more than twice in the same manner as mentioned above. If necessary, the previous contact product may be washed with an inert medium, and component F (and the medium) may be freshly added.

In the case where contacting with component F is performed twice or more, the intermediate contact product may be contacted with an inert hydrocarbon, halogenated hydrocarbon, or metal halide compound (component G) prior to the subsequent contact.

The inert hydrocarbon that can be used is an aliphatic, alicyclic, or aromatic hydrocarbons. Their examples are n-hexane, methylhexane, dimethylhexane, ethylhexane, ethylmethylpentane, n-heptane, methylheptane, trimethylpentane, dimethylheptane, ethylheptane, trimethylhexane, trimethylheptane, n-octane, methyloctane, dimethyloctane, n-undecane, n-dodecane, n-tridecane, n-tetradecane, n-pentadecane, n-hexadecane, n-octadecane, n-nonadecane, n-eicosane, cyclopentane, cyclohexane, methylcyclopentane, cycloheptane, dimethylcyclopentane, methylcyclohexane, ethylcyclopentane, dimethylcyclohexane, ethylcyclohexane, cyclooctane, indan, n-butylcyclohexane, isobutylcyclohexane, adamantane, benzene, toluene, xylene, ethylbenzene, tetramethylbenzene, n-butylbenzene, isobutylbenzene, propyltoluene, decalin, and tetralin.

The halogenated hydrocarbon that can be used is a monoor polyhalogen substituted saturated or unsaturated aliphatic, alicyclic, or aromatic hydrocarbon having 1 to 12 carbon atoms. Their examples derived from aliphatic compounds are methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene,1,1,2-tribromoethylene, pentachloroethane, hexachloroethane, hexabromoethane, n-propyl chloride, 1,2-dichloropropane, hexachloropropylene, octachloropropane, decabromobutane, and chlorinated paraffin. The examples derived from alicyclic compounds are chlorocyclopropane, tetrachlorocyclopentane, hexachlorocyclopentadiene, and hexachlorocyclohexane. The examples derived from aromatic compounds are chlorobenzene, bromobenzene, o-dichlorobenzene, p-dichlorobenzene, hexachlorobenzene, hexabromobenzene, benzotrichloride, and o-chlorobenzotrichloride. These compounds may be used individually or in combination with one another.

The metal halide compound, or the halide of an element selected from the group of elements in Groups IIIa, IVa, and Va of the Periodic Table (called a metal halide hereinafter) includes the chloride, flouride, bromide, and iodide of B, Al, Ga, In, Si, Ge, Sn, Pb, As, Sb, and Bi. Preferable among them are $BCl_3$, $BBr_3$, $BI_3$, $AlCl_3$, $AlBr_3$, $AlI_3$, $GaCl_3$, $GaBr_3$, $InCl_3$, $TlCl_3$, $SiCl_4$, $SnCl_4$, $SbCl_5$, and $SbF_5$.

Where the contacting with component F is performed twice or more and the intermediate contact product is contacted with an inert hydrocarbon, halogenated hydrocarbon, or metal halide in the interval between the preceding contact and the succeeding contact, the contacting is performed at 0° to 200° C. for 5 minutes to 20 hours, preferably at 20° to 150° C. for 10 minutes to 5 hours. Where component G is a liquid substance, it should preferably be used in such an amount that contact product II is 1 to 1,000 g per liter of component G. Where component G is a solid substance, it is preferable to use it in the form of solution. It should preferably be used in such an amount that the amount of contact product II is 0.01 to 100 g per g of component G.

After the contacting of contact product II with component F, the resulting contact product may be contacted further with component G in the same manner as mentioned above for the contacting with component G.

The catalyst component pertaining to the invention can be produced as mentioned above. The catalyst component thus produced may be washed, if necessary, with an inert hydrocarbon such as hexane, heptane, octane, cyclohexane, benzene, toluene, and xylene, followed by drying, if necessary.

The catalyst component of this invention is a powder having a specific surface area of 10 to 1,000 $m^2/g$ as measured by the BET method at the adsorption temperature of liquid nitrogen, a pore volume of 0.05 to 5 $cm^3/g$, and a narrow particle size distribution with uniform particle size. It is composed of 3 to 90 wt % of metal oxide, 1 to 25 wt % of magnesium, 0.5 to 10 wt % of titanium, and 4 to 60 wt % of chlorine.

Catalyst for olefin polymerization

The catalyst component obtained in this invention is combined with an organic compound of a metal in Groups I to III of the Periodic Table, to be made into a catalyst for homopolymerization of an olefin or for copolymerization of an olefin with another olefin.

Organic compound of metal in Groups I to III

An organic compound of lithium, magnesium, calcium, zinc, or aluminum can be used as the organometallic compound. Among these organometallic compounds, an organoaluminum compound is preferable. The organoaluminum compound that can be used is represented by the formula $R_m^2AlX_{3-m}$ (where $R^2$ is an alkyl group or aryl group; X is a halogen atom, alkoxyl group, or hydrogen atom; and m is number in the range of $1 \leqslant n \leqslant 3$). The examples are alkyl aluminum compounds having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and diakyl aluminum monohydride, and mixtures thereof and complex compounds thereof. The specific examples include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and dissobutyl aluminum hydride.

Preferable among these compounds is trialkyl aluminum, particularly triethyl aluminum and triisobutyl aluminum. The trialkyl aluminum may be used in combination with other organoaluminum compounds such as commercially available diethyl aluminum chloride, ethyl aluminum dichloride, ethyl aluminum sesquichloride, diethyl aluminum ethoxide, and diethyl aluminum hydride, or a mixture thereof or a complex compound thereof.

Another organoaluminum compound that can be used is one in which two or more aluminum atoms are connected through an oxygen atom or nitrogen atom. Examples of of such compounds are

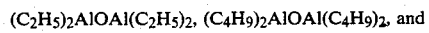

Organometallic compounds other than organoaluminum compounds are diethyl magnesium, ethyl magnesium chloride, diethyl zinc, $LiAl(C_2H_5)_4$, and $LiAl(C_7H_{15})_4$.

The organometallic compound may be used alone or in combination with an electron donor compound. The electron donor compound may be any compound which is used as component E at the time of preparation of the catalyst component. Other electron donor compounds include organosilicon compounds and those compounds containing a hetero atom such as nitrogen, sulfur, oxygen, and phosphorus.

Examples of the organosilicon compounds include tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, aryltrimethoxysilane, phenyltrimethoxysilane, phenyltriethoxysilane, benzyltriphenoxysilane, methyltriaryloxysilane, dimethyldimethoxysilane, dimethyldiethoxysilane, dimethyldiisopropoxysilane, dimethyldibutoxydimethyldiethoxysilane, silane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diaryldipropoxysilane, diphenyldianyloxysilane, methylphenyldimethoxysilane, and chlorophenyldiethoxysilane.

Examples of the electron donor compound containing a hetero atom are given below. Those which contain a nitrogen atom include 2,2,6,6-tetramethypiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetronitrile, aniline, paratoluidine, orthotoluidine, metatoluidine, triethylamine, diethylamine, dibutylamine, tetramethylenediamine, and tributylamine. Those which contain a sulfur atom include thiophenol, thiophene, ethyl 2-thiophenecarboxylate, ethyl 3-thiophenecarboxylate, 2-methylthiophene, methylmercaptan, ethylmercaptan, isopropylmercaptan, butyl mercaptan, diethyl thioether, diphenyl thioether, methyl benzenesulfonate, methyl sulfite, and ethyl sulfite. Those which contain an oxygen atom include tetrahydrofuran, 2-methyltetrahydrofuran, 3-methyltetrahydrofuran, 2-ethyltetrahydrofuran, dioxane, dimethyl ether, diethyl ether, dibutyl ether, diisoamyl ether, diphenyl ether, anisole, acetophenone, acetone, methyl ethyl ketone, acetyl acetone, ethyl 2-furoate, isoamyl 2-furoate, methyl 2-furoate, and propyl 2-furoate. Those which contain a phosphorus atom include triphenyl phosphine, tributyl phosphine, triphenyl phosphite, tribenzyl phosphite, diethyl phosphate, and diphenyl phosphate.

Two or more kinds of the electron donor compounds may be used. They may be used when the catalyst component is combined with an organometallic compound or used after the contacting with an organometallic compound.

Usually the organometallic compound is used in an amount of 1 to 2000 gram-mol, particularly 20 to 500 gram-mol, per gram-atom of titanium in the catalyst component of this invention.

The amount of the organometallic compound is 0.1 to 40 gram-atom, preferably 1 to 25 gram-atom in terms of aluminum per mol of the electron donor compound.

Polymerization of olefins

The catalyst composed of the catalyst component obtained as mentioned above and an organometallic compound (and an electron donor compound) is useful for homopolymerization of a monoolefin having 2 to 10 carbon atoms and also for copolymerization of a monoolefin having 2 to 10 carbon atoms with another monoolefin or a diolefin having 3 to 10 carbon atoms. It is an outstanding catalyst for homopolymerization of alpha-olefins, particularly alpha-olefins having 3 to 6 carbon atoms, such as propylene, 1-butene, 4-methyl-1-pentene, and 1-hexene; and for random and block copolymerization of the above mentioned alpha-olefins with one another and/or with ethylene.

The polymerization may be performed in either gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene; or in the liquid monomer. The polymerization temperature is usually −80° C. to +150° C., preferably 40° C. to 120° C. The polymerization pressure is 1 to 60 atm. The molecular weight modification of the resulting polymer is accomplished by the aid of hydrogen or any known molecular weight modifier present in the system. In the case of copolymerization, the quantity of an olefin to be copolymerized is usually less than 30 wt %, particularly 0.3 to 15 wt %, based on the principal olefin. The polymerization with the catalyst system of this invention may be performed continuously or batchwise under the commonly used conditions. The copolymerization may be accomplished in one step or in two or more steps.

Effect of the invention

The catalyst component of this invention is effective for the production of polyolefins, particularly isotactic polypropylene, ethylene-propylene random copolymers, and ethylene-propylene block copolymers.

The polymerization catalyst containing the catalyst component of this invention has a high polymerization activity and high stereoregularity and keeps the high activity for a long period at the time of polymerization. In addition, it provides polyolefin powder having a high bulk density and good flowability.

EXAMPLES

The invention is now described in more detail with reference to the following examples and application examples, which are not intended to limit the scope of the invention. Percent (%) in the examples and application examples means wt %, unless otherwise indicated.

The heptane insolubles (abbreviated as HI hereinafter) which indicate the ratio of the crystalline phase in the polymer are the amount of the polymer which remains undissolved when the polymer is extracted with boiling n-heptane for 6 hours in a Soxhlet apparatus of improved type.

Melt flow rate (MFR) was measured according to ASTM D1238, and bulk density as measured according to ASTM D1896-69, method A.

EXAMPLE 1

Contacting of silicon oxide with n-butylethyl magnesium

In a 200-ml flask equipped with a dropping funnel and stirrer, with the atmosphere therein replaced with nitrogen, were placed 5 g of silicon oxide (abbreviated as $SiO_2$ hereinafter) and 40 ml of n-heptane. The silicon oxide is G-952, a product of DAVISON, having a specific surface area of 302 m$^2$/g, a pore volume of 1.54 m$^3$/g, and an average pore diameter of 204 A. Prior to use, it was calcined in a nitrogen stream at 200° C. for 2 hours, and then at 700° C. for 5 hours). Further, there was added 20 ml of 20% solution of n-butylethylmagnesium (abbreviated as BEM hereinafter) in n-heptane (MAGALA BEM, a product of Texas Alkyls, the solution containing 26.8 mmol of BEM), followed by stirring at 90° C. for 1 hour.

Contacting with tetraethoxysilane

The resulting suspension was cooled to 0° C. To the cooled suspension was added dropwise 20 ml of n-heptane solution containing 22.1 g (53.6 mmol) of tetraethoxysilane from the dropping funnel over 30 minutes. The reactants were slowly heated to 50° C. for 1 hour. After the completion of reaction, the supernatant liquid was removed by decantation. The resulting solid product was washed with 60 ml of n-heptane at room temperature, and the supernatant liquid was removed by decantation. The washing with n-heptane was repeated four times.

Contacting with 2,2,2-trichloroethanol

The solid product obtained in the above-mentioned step was suspended in 50 ml of n-heptane. To the resulting suspension was added a solution containing 8.0 g (53.6 mmol) of 2,2,2-trichloroethanol in 10 ml of n-heptane from a dropping funnel at 0° C. over 30 minutes. The reactants were slowly heated to 60° C. over 1 hour, and stirring was continued at 60° C. for 1 hour. After the completion of reaction, the resulting solid product was washed twice with 60 ml of n-heptane and then three times with 60 ml of toluene. The resulting solid product designated as solid component I) was found to contain 36.6% of $SiO_2$, 5.1% of magnesium, and 38.5% of chlorine. It was also found to have a specific surface area of 257 $m^2/g$ and a pore volume of 0.76 $cm^3/g$.

Contacting with di-n-butyl phthalate and titanium tetrachloride

To the solid component I obtained in the above-mentioned step were added 15 ml of toluene and 0.6 g of di-n-butyl phthalate, followed by reaction at 50° C. for 2 hours. Then 40 ml of titanium tetrachloride was added, followed by reaction at 90° C. for 2 hours. The resulting solid product was washed eight times with 60 ml of n-hexane at room temperature, followed by drying under reduced pressure at room temperature for 1 hour. There was obtained 8.4 g of catalyst component having a specific surface area of 279 $m^2/g$ and a pore volume of 0.81 $cm^3/g$. It was also found to contain 53.1% of $SiO_2$, 7.4% of magnesium, 24.8% of chlorine, and 3.1% of titanium.

EXAMPLE 2

The solid product obtained after the contacting with titanium tetrachloride in Example 1 was separated, and it was reacted with 40 ml of titanium tetrachloride at 90° C. for 2 hours. The resulting solid product was treated in the same manner as in Example 1. Thus there was obtained a catalyst component containing 3.2% of titanium.

EXAMPLE 3

After the contacting with titanium tetrachloride in Example 1, the supernatant liquid was removed by decantation, and the solid produce was washed with 60 ml of toluene at 90° C. for 15 minutes. Washing with toluene was repeated. To the solid product were added 15 ml of toluene and 40 ml of titanium tetrachloride, followed by reaction at 90° C. for 2 hours. After washing with n-hexane and drying in the same manner as in Example 1, there was obtained a catalyst component containing 3.1% of titanium.

EXAMPLE 4

A catalyst component (83 g) was prepared in the same manner as in Example 3, except that the contacting with titanium tetrachloride was performed at 120° C. instead of 90° C. The catalyst component was found to have a specific surface area of 283 $m^2/g$ and a pore volume of 0.79 $cm^3/g$. It was also found to contain 53.5% of $SiO_2$, 7.3% of magnesium, 24.5% of chlorine, and 2.6% of titanium.

EXAMPLE 5

A catalyst component containing 2.5% of titanium was prepared in the same manner as in Example 4, except that di-n-butyl phthalate and titanium tetrachloride were added simultaneously to solid component I instead of separately.

EXAMPLE 6

A catalyst component containing 2.4% of titanium was prepared in the same manner as in Example 4, except that the contacting of solid component I with di-n-butyl phthalate and titanium tetrachloride was performed as follows: At first, 60 ml of titanium tetrachloride was added, followed by rapid heating to 120° C., and then 0.6 g of di-n-butyl phthalate was added, followed by reaction at 120° C. for 2 hours.

EXAMPLE 7

To solid component I obtained in Example 1 was added 60 ml of titanium tetrachloride, followed by rapid heating to 120° C. with stirring; and then 0.6 g of di-n-butyl phthalate was added, followed by reaction at 90° C. for 2 hours. After the completion of reaction, the supernatant liquid was removed and 60 ml of titanium tetrachloride was added, followed by reaction at 120° C. for 2 hours. The resulting solid product was washed and dried in the same manner as in Example 1. Thus there was obtained a catalyst component containing 2.9% of titanium.

EXAMPLE 8

A catalyst component containing 3.9% of titanium was prepared in the same manner as in Example 7, except that the solid component I was washed twice with 60 ml of titanium tetrachloride at 90° C. for 15 minutes at the interval between the first and second contacting with titanium tetrachloride.

EXAMPLES 9 to 11

Example 4 was repeated, except that toluene as the inert medium used in the contacting with di-n-butyl phthalate and titanium tetrachloride was replaced by xylene (Example 9), n-heptane (Example 10), or 1,2-dichloroethane (Example 11). The titanium content in each catalyst component was 2.7% (Example 9), 2.9% Example 10), and 2.5% (Example 11).

EXAMPLES 12 to 15

Example 4 was repeated, except that $SiO_2$ was replaced by the metal oxide shown below. Thus there were obtained catalyst components each containing titanium as shown below.

| Example | Metal oxide | Conditions of calcination | Titanium content (%) |
|---|---|---|---|
| 12 | $Al_2O_3$ | 200° C./2 hours<br>700° C./5 hours | 3.3 |
| 13 | $(MgO)_2(SiO_2)_3$ | 200° C./2 hours<br>500° C./5 hours | 3.0 |
| 14 | Mixture of 1 kg of $SiO_2$ and 100 g of $Al_2O_3$ | 200° C./2 hours<br>700° C./5 hours | 2.9 |
| 15 | Mixture of 1 kg of $SiO_2$ and 20 g of $CrO_3$ | 200° C./2 hours<br>700° C./5 hours | 2.5 |

EXAMPLES 16 to 18

Example 4 was repeated, except that the BEM was replaced by the organo-Mg shown below. Thus there were obtained catalyst components each containing titanium as shown below.

| Example | Organo Mg | Titanium content (%) |
| --- | --- | --- |
| 16 | Di-n-hexylmagnesium (MAGALA DNHM, made by Texas Alkyls) | 2.5 |
| 17 | Di-n-butylmagnesium (0.5 mol) - triethyl aluminum (1 mol) complex, (MAGALA 0.5E, made by Texas Alkyls) | 2.6 |
| 18 | Di-n-butylmagnesium (7.5 mol) - triethyl aluminum (1 mol) complex, (MAGALA 7.5E, made by Texas Alkyls) | 2.5 |

EXAMPLES 19 to 26

Example 4 was repeated, except that tetraethoxysilane was replaced by the hydrocarbyloxy group-containing organic compound shown below. Thus there were obtained catalyst components each containing titanium as shown below.

| Example | Hydrocarbyloxy group containing compound* | Titanium content (%) |
| --- | --- | --- |
| 19 | Si(On-Bu)$_4$ | 2.5 |
| 20 | Si(OPh)$_4$ | 2.9 |
| 21 | PhSi(OEt)$_3$ | 2.6 |
| 22 | C(OEt)$_4$ | 2.4 |
| 23 | HC(OEt)$_3$ | 2.6 |
| 24 | P(OEt)$_3$ | 3.0 |
| 25 | B(OEt)$_3$ | 3.1 |
| 26 | Al(OEt)$_3$ | 2.9 |

*Bu = C$_4$H$_9$, Ph = C$_6$H$_5$, Et = C$_2$H$_5$

EXAMPLES 27 to 45

Example 4 was repeated, except that 2,2,2-trichloroethanol was replaced by the halogen-containing alcohol shown below. Thus there were obtained catalyst components each ontaining titanium as shown below.

| Example | Halogen-containing alcohol | Titanium content (%) |
| --- | --- | --- |
| 27 | 1,1,1-trichloro-2-propanol | 2.4 |
| 28 | β,β,β-trichloro-tert-butanol | 2.6 |
| 29 | 2.2-dichloroethanol | 2.8 |
| 30 | 1,3-dichloro-2-propanol | 2.7 |
| 31 | 2-chloroethanol | 2.9 |
| 32 | 4-chloro-1-butanol | 2.9 |
| 33 | 6-chloro-1-hexanol | 2.8 |
| 34 | p-chlorophenol | 3.0 |
| 35 | 4-chloro-o-cresol | 3.1 |
| 36 | 2,4,6-trichlorophenol | 2.5 |
| 37 | tetrachlorohydroquinone | 2.6 |
| 38 | 1-bromo-2-butanol | 2.7 |
| 39 | 1,3-dibromo-2-propanol | 2.8 |
| 40 | p-bromophenol | 2.9 |
| 41 | 2,4,6-tribromophenol | 2.8 |
| 42 | p-iodophenol | 2.7 |
| 43 | 2,4,6-triiodophenol | 3.0 |
| 44 | 2,2,2-trifluoroethanol | 2.8 |
| 45 | p-fluorophenol | 2.8 |

EXAMPLES 46 to 70

Example 4 was repeated, except that the solid component I was contacted with an electron donor compound shown below in place of di-n-butyl phthalate. Thus there were obtained catalyst components each containing titanium as shown below.

| Example | Electron donor compound | Titanium content (%) |
| --- | --- | --- |
| 46 | Ethyl benzoate | 2.2 |
| 47 | Diisobutyl phthalate | 2.7 |
| 48 | Phthalic anhydride | 2.3 |
| 49 | Phthalic dichloride | 2.5 |
| 50 | n-Butyl phthalate chloride | 2.4 |
| 51 | Mono-n-butyl phthalate | 2.4 |
| 52 | Benzoic anhydride | 2.9 |
| 53 | Benzoyl chloride | 2.0 |
| 54 | Ethyl cinnamate | 2.9 |
| 55 | Ethyl cyclohexanecarboxylate | 2.8 |
| 56 | Tartaric acid | 2.6 |
| 57 | Di-n-butyl tartrate | 2.3 |
| 58 | Isobutyl methacrylate | 2.5 |
| 59 | Phthalic acid | 2.4 |
| 60 | Benzoic acid | 3.0 |
| 61 | Di-n-butyl maleate | 3.1 |
| 62 | Diisobutyl sebacate | 2.7 |
| 63 | Tri-n-butyl trimellitate | 2.6 |
| 64 | Ethanol | 2.9 |
| 65 | Isobutanol | 2.7 |
| 66 | 2-Ethylhexanol | 2.6 |
| 67 | p-Cresol | 2.8 |
| 68 | Diethyl ether | 2.0 |
| 69 | Di-n-butyl ether | 2.1 |
| 70 | Diphenyl ether | 2.1 |

EXAMPLE 71

Contacting of silicon oxide with tetraethoxysilane

In a 200-ml flask equipped with a dropping funnel and stirrer, with the atmosphere therein replaced with nitrogen, were placed 5 g of silicon oxide (the one used in Example 1) and 40 ml of n-heptane and 11.2 g of tetraethoxysilane. Contacting was performed by stirring at 90° C. for 1 hour.

Contacting with n-butylethyl magnesium

The suspension obtained in the above step was cooled to 0° C. To the cooled suspension was added a solution containing 20 ml of BEM in 20 ml of n-heptane from the dropping funnel over 30 minutes. Stirring was continued at 50° C. for 1 hour. After the completion of reaction, the resulting solid product was washed five times with 60 ml of n-heptane by decantation.

Contacting with 2,2,2-trichloroethanol, di-n-butyl phthalate, and titanium tetrachloride The solid component obtained in the above-mentioned step was contacted with 2,2,2-trichloroethanol, di-n-butyl phthalate, and titanium tetrachloride in the same manner as in Example 4. Thus there was obtained 8.5 g of catalyst component containing 2.6% of titanium.

EXAMPLE 72

Contacting of n-butylethyl magnesium with tetraethoxysilane

In a 200-ml flask equipped with a dropping funnel and stirrer, with the atmosphere therein replaced with nitrogen, were placed 20 ml of BEM solution (the one used in Example 1) and 40 ml of n-heptane, followed by cooling to 0° C. To the cooled reactants was added a solution containing 11.2 g of tetraethoxysilane in 20 ml of n-heptane from the dropping funnel over 30 minutes to give a uniform solution.

Contacting with silicon oxide

In a 200-ml flask equipped with a dropping funnel and stirrer, with the atmosphere therein replaced with nitrogen, were placed 5 g of $SiO_2$ (the one used in Example 1) and 20 ml of heptane, following by cooling to 0° C. While the temperature was kept at 0° C., the above-mentioned solution was added. The reactants were slowly heated to 50° C. over 1 hour, and stirring was continued at 59° C. for 1 hour. After the completion of reaction, the solid product was washed five times with 60 ml of n-heptane by decantation.

Contacting with 2,2,2-trichloroethanol, di-n-butyl phthalate, and titanium tetrachloride The solid component obtained in the above-mentioned step was contacted with 2,2,2-trichloroethanol, di-n-butyl phthalate, and titanium tetrachloride in the same manner as in Example 4. Thus there was obtained 8.8 g of catalyst component containing 2.5% of titanium.

COMPARATIVE EXAMPLE 1

Example 4 was repeated, except that treatment with 2,2,2-trichloroethanol was not performed. There was obtained 8.7 g of catalyst component containing 3.5% of titanium.

COMPARATIVE EXAMPLE 2

Example 4 was repeated, except that treatment with tetraethoxysilane was not performed and washing with n-heptane was performed before treatment with 2,2,2-trichloroethanol. There was obtained 7.0 g of catalyst component containing 2.1% of titanium.

APPLICATION EXAMPLE 1

Into a 1.5-liter stainless steel autoclave equipped with a stirrer was charged under a nitrogen atmosphere a mixture prepared by mixing the following constituents, followed by standing for 5 minutes. (a) 30.3 mg of the catalyst component obtained in Example 1. (b) 0.97 ml of solution containing 1 mol of triethylaluminum (abbreviated as TEAL hereinafter) in 1 liter of n-heptane. (c) 0.97 ml of solution containing 0.1 mol of phenyltriethoxysilane (abbreviated as PES hereinafter) in 1 liter of n-heptane. Then 0.1 liters of hydrogen gas as a molecular weight modifier and 1 liter of liquified propylene were forced into the autoclave. The reaction system was heated to 70° C. and the polymerization of propylene was carried out for 1 hour. After the completion of polymerization, unreacted propylene was purged. There was obtained 206 g of white polypropylene powder having an HI of 97.0%, an MFR of 4.9, and a bulk density of 0.42 g/cm$^3$. [Kc (amount of polymer (g) produced per gram of the catalyst component)=6,800, and Kt (amount of polymer (kg) produced per gram of titanium in the catalyst component)=219].

APPLICATION EXAMPLE 2 to 74

Polymerization of propylene was carried out in the same manner as in Application Example 1, except that the catalyst components obtained in Examples 2 to 72 and Comprative Examples 1 and 2 were used. The results are shown in the following table.

| Application Example | Catalyst Component | Kc (g/g · cat) | Kt (kg/g · Ti) | HI (%) | MFR (g/10 min) | Bulk Density (g/cm$^3$) |
|---|---|---|---|---|---|---|
| 2 | Example 2 | 6900 | 216 | 97.1 | 5.6 | 0.42 |
| 3 | Example 3 | 7400 | 299 | 97.5 | 6.2 | 0.43 |
| 4 | Example 4 | 8100 | 312 | 97.9 | 4.9 | 0.43 |
| 5 | Example 5 | 7900 | 316 | 97.8 | 7.7 | 0.43 |
| 6 | Example 6 | 7600 | 317 | 97.8 | 6.8 | 0.43 |
| 7 | Example 7 | 7200 | 248 | 97.4 | 5.1 | 0.42 |
| 8 | Example 8 | 7500 | 250 | 97.6 | 4.3 | 0.42 |
| 9 | Example 9 | 7300 | 270 | 97.7 | 6.9 | 0.42 |
| 10 | Example 10 | 6900 | 238 | 97.4 | 5.5 | 0.42 |
| 11 | Example 11 | 7900 | 316 | 97.9 | 7.3 | 0.43 |
| 12 | Example 12 | 7300 | 221 | 96.9 | 4.1 | 0.41 |
| 13 | Example 13 | 6700 | 223 | 96.5 | 7.1 | 0.39 |
| 14 | Example 14 | 5800 | 234 | 95.9 | 8.6 | 0.39 |
| 15 | Example 15 | 6200 | 248 | 96.1 | 6.3 | 0.40 |
| 16 | Example 16 | 7700 | 308 | 97.8 | 4.6 | 0.43 |
| 17 | Example 17 | 7600 | 292 | 97.8 | 7.5 | 0.43 |
| 18 | Example 18 | 7300 | 292 | 97.6 | 6.6 | 0.42 |
| 19 | Example 19 | 7900 | 316 | 98.0 | 7.9 | 0.43 |
| 20 | Example 20 | 6400 | 221 | 97.0 | 5.3 | 0.42 |
| 21 | Example 21 | 7700 | 296 | 97.7 | 4.6 | 0.42 |
| 22 | Example 22 | 6900 | 288 | 97.1 | 8.1 | 0.42 |
| 23 | Example 23 | 6800 | 283 | 96.9 | 5.5 | 0.42 |
| 24 | Example 24 | 5900 | 197 | 95.5 | 4.8 | 0.41 |
| 25 | Example 25 | 6100 | 197 | 95.9 | 6.7 | 0.41 |
| 26 | Example 26 | 6500 | 224 | 96.1 | 3.9 | 0.41 |
| 27 | Example 27 | 7300 | 306 | 97.7 | 4.5 | 0.43 |
| 28 | Example 28 | 7700 | 297 | 97.8 | 5.1 | 0.43 |
| 29 | Example 29 | 6500 | 232 | 97.5 | 5.8 | 0.42 |
| 30 | Example 30 | 6600 | 244 | 97.3 | 5.5 | 0.42 |
| 31 | Example 31 | 6300 | 217 | 97.3 | 6.3 | 0.42 |
| 32 | Example 32 | 6300 | 217 | 97.2 | 5.8 | 0.42 |
| 33 | Example 33 | 6000 | 214 | 97.2 | 6.9 | 0.41 |
| 34 | Example 34 | 7200 | 240 | 97.5 | 5.1 | 0.43 |
| 35 | Example 35 | 6900 | 223 | 97.6 | 4.6 | 0.43 |
| 36 | Example 36 | 7300 | 292 | 97.5 | 6.4 | 0.43 |
| 37 | Example 37 | 5900 | 227 | 97.2 | 6.7 | 0.41 |
| 38 | Example 38 | 5600 | 207 | 97.1 | 7.5 | 0.41 |
| 39 | Example 39 | 6100 | 218 | 96.8 | 5.6 | 0.41 |
| 40 | Example 40 | 6400 | 221 | 96.7 | 6.8 | 0.41 |

-continued

| Application Example | Catalyst Component | Kc (g/g · cat) | Kt (kg/g · Ti) | HI (%) | MFR (g/10 min) | Bulk Density (g/cm³) |
| --- | --- | --- | --- | --- | --- | --- |
| 41 | Example 41 | 5700 | 204 | 97.1 | 5.7 | 0.42 |
| 42 | Example 42 | 5500 | 204 | 96.5 | 4.3 | 0.41 |
| 43 | Example 43 | 6000 | 200 | 97.1 | 7.9 | 0.42 |
| 44 | Example 44 | 6800 | 243 | 97.0 | 4.9 | 0.43 |
| 45 | Example 45 | 6700 | 239 | 97.1 | 6.3 | 0.43 |
| 46 | Example 46 | 6600 | 300 | 95.4 | 5.0 | 0.43 |
| 47 | Example 47 | 7900 | 293 | 97.9 | 4.2 | 0.43 |
| 48 | Example 48 | 7100 | 309 | 97.5 | 4.6 | 0.42 |
| 49 | Example 49 | 7600 | 304 | 97.8 | 5.3 | 0.43 |
| 50 | Example 50 | 6900 | 288 | 97.2 | 3.9 | 0.43 |
| 51 | Example 51 | 6800 | 283 | 97.4 | 6.7 | 0.42 |
| 52 | Example 52 | 5900 | 203 | 96.1 | 4.4 | 0.42 |
| 53 | Example 53 | 6500 | 325 | 95.8 | 4.9 | 0.42 |
| 54 | Example 54 | 5400 | 186 | 96.3 | 7.3 | 0.41 |
| 55 | Example 55 | 5800 | 207 | 96.5 | 6.7 | 0.41 |
| 56 | Example 56 | 5300 | 204 | 95.9 | 5.5 | 0.41 |
| 57 | Example 57 | 6200 | 270 | 96.1 | 5.8 | 0.42 |
| 58 | Example 58 | 6600 | 254 | 96.6 | 7.4 | 0.42 |
| 59 | Example 59 | 6800 | 283 | 97.1 | 4.9 | 0.42 |
| 60 | Example 60 | 6300 | 210 | 95.8 | 3.8 | 0.41 |
| 61 | Example 61 | 7000 | 226 | 96.5 | 5.9 | 0.42 |
| 62 | Example 62 | 6900 | 256 | 97.1 | 4.3 | 0.42 |
| 63 | Example 63 | 7300 | 281 | 97.5 | 5.4 | 0.43 |
| 64 | Example 64 | 5400 | 186 | 95.2 | 7.3 | 0.41 |
| 65 | Example 65 | 5700 | 211 | 95.4 | 5.2 | 0.41 |
| 66 | Example 66 | 6000 | 236 | 95.5 | 4.8 | 0.42 |
| 67 | Example 67 | 6100 | 218 | 96.1 | 6.4 | 0.42 |
| 68 | Example 68 | 4900 | 245 | 95.3 | 7.9 | 0.40 |
| 69 | Example 69 | 5600 | 267 | 95.8 | 8.6 | 0.41 |
| 70 | Example 70 | 5900 | 281 | 96.0 | 6.3 | 0.41 |
| 71 | Example 71 | 8000 | 308 | 97.9 | 4.8 | 0.43 |
| 72 | Example 72 | 7800 | 312 | 97.8 | 5.3 | 0.43 |
| 73 | Compar. Example 1 | 3700 | 106 | 95.7 | 8.9 | 0.41 |
| 74 | Compar. Example 2 | 3900 | 186 | 98.0 | 5.1 | 0.43 |

The polypropylene powder obtained in Application Example 4 was examined for particle size distribution. The results are shown below.

| Particle diameter (μm) | Distribution |
| --- | --- |
| Smaller than 149 | 0 |
| 149 to 250 | 0.1 |
| 250 to 350 | 2.1 |
| 350 to 420 | 5.7 |
| 420 to 590 | 24.8 |
| 590 to 840 | 41.4 |
| 840 to 1000 | 12.1 |
| 1000 to 1680 | 13.7 |
| Larger than 1680 | 0.1 |

APPLICATION EXAMPLE 75

Gas-phase polymerization of propylene

In a 5-liter autoclave equipped with a stirrer was placed 150 g of polypropylene powder which has previous been dried at 90° C. for 4 hours in a nitrogen stream. To this autoclave, with the stirrer running at 150 rpm, were fed the catalyst component prepared in the same manner as in Example 4 (at a rate of 20 mg/hour), TEAL (at a rate of 0.7 mmol/hour), PES (at a rate of 0.05 mmol/hour), propulene (at a rate of 130 g/hour), and hydrogen gas (at a rate of 15 ml/hour). Polymerization of propylene was performed continuously at a polymerization temperature of 70° C. and under a polymerization pressure of 20 kg/cm², and the polymerization product was discharged continuously There was obtained polypropylene powder at a rate of 85 g/hour. The polymer had an MFR of 5.9 g/10 min and an HI of 96.9%.

APPLICATION EXAMPLE 76

Block copolymerization of propylene

Into a 1.5 liter autoclave equipped with a stirrer was charged under a nitrogen atmosphere a mixture prepared by mixing the following constituents, followed by standing for 5 minutes. (a) 30.0 mg of the catalyst component obtained in Example 4. (b) 0.75 ml of TEAL solution (1 mol/liter) in n-heptane. (c) 0.75 ml of PES solution (0.1 mol/liter) in n-heptane. Then 100 ml of hydrogen gas and 1 liter of liquified propylene were forced into the autoclave. The reaction system was heated to 70° C. and the homopolymerization of propylene was carried out for 1 hour. (According to the polymerization experiment carried out separately under the same condition, the resulting polypropylene had an HI of 97.9%.) After the completion of polymerization, unreacted propylene was purged and the atmosphere in the autoclave was replaced with nitrogen gas. Then an ethylenepropylene mixture gas [ethylene/propylene=1.5 (molar ratio)] was introduced continuously so that the monomer gas pressure was kept at 1.5 atm. Copolymerization was carried out at 70° C. for 3 hours. After the completion of polymerization, unreacted mixture gas was purged. Thus there was obtained 219 g of propylene block copolymer.

The ratio of the copolymer portion was calculated at 25.8% on the basis of the consumption of mixture gas and the total amount of polymer produced. The content of ethylene in the entire polymer was 12.6% according to infrared spectrophotometry. This translates into an ethylene content of 49% in the copolymer fraction. The amounts of propylene homopolymer and copolymer fractions produced per g of catalyst component were 7900 g and 275 g, respectively, which were calculated from the total amount of polymer produced and the consumption of mixture gas. The resulting block copolymer had an MFR of 2.7 g/10 min and a bulk density of 0.42 g/cm$^3$. There was no agglomeration of polymer particles and fouling did not take place at all in the autoclave.

APPLICATION EXAMPLE 77

Random copolymerization of propylene and ethylene

Random copolymerization of propylene and ethylene was performed by carrying out the polymerization of propylene in the same manner as in Application Example 1, during which 0.6 g each of ethylene was introduced into the autoclave six times at intervals of 10 minutes. After the completion of polymerization, unreacted monomers were purged from the polymerization system. Thus there was obtained 264 g of propylene-ethylene random copolymer. The copolymer was found to contain 2.2% of ethylene according to infrared spectrophotometry. The amount of the copolymer formed per g of the catalyst component was 8700 g. The block copolymer had an MFR of 13.5 g/10 min and a bulk density of 0.42g/cm$^3$.

APPLICATION EXAMPLE 78

Polymerization of 1-butene

Polymerization of 1-butene was performed in the same manner as in Application Example 1, except that 55.0 mg of the catalyst component obtained in Example 4 was used, 400 ml of isobutane was used as a medium, liquefied propylene was replaced by 400 ml of 1-butene (liquid), the polymerization temperature was 40° C., and the polymerization time was 5 hours. There was obtained 176 g of powder poly-1-butene. Kc was 3200 g/g-catalyst component. The polymer had an MFR of 3.8 g/10 min and a bulk density of 0.41 g/cm$^3$. The amount of ether insolubles (residues remaining after extraction with boiling diethyl either for 5 hours) was 99.1%.

APPLICATION EXAMPLE 79

Polymerization of 4-methyl-1-pentene

Polymerization of 4-methyl-1-pentene was performed in the same manner as in Application Example 75, except that 77.0 mg of the catalyst component obtained in Example 4 was used. 400 ml of 4-methyl-1-pentene, was used. There was obtained 192 g of poly-4-methyl-1-pentene in the powder form. Kc was 2490 g/g-catalyst component. The polymer had an MFR of 3.6 g/10 min, a bulk density of 0.39 g/cm$^3$, and an ether insoluble of 98.7%.

What is claimed is:

1. A titanium containing supported catalyst component comprising the product obtained by contacting:
   (1) the reaction product obtained by contacting together
      (a) a metal oxide or a composite of metal oxides of Group IIA, IIB, IIIA, IIIB, IVA or IVB of the Periodic Table,
      (b) a dihydrocarbyl magnesium compound represented by the formula RMgR', mixtures thereof or a complex with an organic compound of aluminum, boron, beryllium or zinc, and
      (c) a hydrocarbyloxy. group-containing compound represented by the formula R''$_q$Mm(OR''')$_n$,
   (2)
      (d) a halogen-containing alcohol,
   (3)
      (e) an electron-donating compound, and
   (4)
      (f) a di-, tri-, or tetravalent titanium compound,
   wherein R and R' are the same or different and are selected from alkyl, cycloalkyl, aryl and aralkyl groups having from 1 to 20 carbon atoms, R'' is a hydrogen atom or a hydrocarbyl group selected from alkyl, alkenyl, aryl or aralkyl groups having from 1 to 20 carbon atoms, R''' is a hydrocarbyl group having from 1 to 20 carbon atoms and selected from alkyl, alkenyl, aryl, or aralkyl groups, M is selected from silicon, carbon, phosphorous, boron or aluminum, m is the valence of M and $m > q \geq 0$, $m \geq n > 0$ and $n+q$ equal m.

2. The titanium containing supported catalyst component of claim 1 wherein the metal oxide is SiO$_2$.

3. The titanium containing supported catalyst component of claim 1 wherein the dihydrocarbyl magnesium compound is n-butyl ethyl magnesium.

4. The titanium containing supported catalyst component of claim 1 wherein the titanium compound is titanium tetrachloride.

5. The titanium containing supported catalyst component of claim 1 wherein the electron-donating compound is selected from carboxylic acids, carboxylic acid esters, carboxylic acid anhydrides, carboxylic acid halides, alcohols, ethers, ketones, amines, amides, nitriles, aldehydes, alcoholates, phosphamides, thioethers, thioesters, carbonic acid esters, and compounds of phosphorous, arsenic or antimony attached to an organic group through a carbon or oxygen atom.

6. The titanium containing supported catalyst component of claim 5 wherein the electron-donating compound is selected from the group consisting of carboxylic acid anhydrides, carboxylic acid esters, carboxylic acid halides, alcohols, or ethers.

7. The titanium containing supported catalyst component of claim 6 wherein the electron-donating compound is a carboxylic acid ester.

8. The titanium containing supported catalyst component of claim 1 wherein the halogen-containing alcohol is a monohydric or polyhydric alcohol and the halogen atom is chlorine.

9. The titanium containing supported catalyst component of claim 8 wherein the halogen-containing alcohol is 2,2,2-trichloro-ethanol.

10. The titanium containing supported catalyst component of claim 1 wherein the hydrocarbyloxy group-containing compound is selected from Si(OC$_2$H$_5$)$_4$, Si(n-OC$_4$H$_9$)$_4$, Si(OC$_6$H$_5$)$_4$, C$_6$H$_5$Si(OC$_2$H$_5$)$_3$, C(OC$_2$H$_5$)$_4$, HC(OC$_2$H$_5$)$_3$, P(OC$_2$H$_5$)$_3$, B(OC$_2$H$_5$)$_3$, and Al(OC$_2$H$_5$)$_3$.

11. The titanium containing supported catalyst component of claim 10 wherein the hydrocarbyloxy group-containing compound is Si(OC$_2$H$_5$)$_4$.

12. A reaction product for use in a titanium containing supported catalyst component, said reaction product obtained by contacting together,
   I. The contact product obtained by contacting
      (a) a metal oxide or a composite of metal oxides of Group IIA, IIB, IIIA, IIIB, IVA, or IVB of the Periodic Table,
      (b) a dihydrocarbyl magnesium compound represented by the formula RMgR', mixtures thereof or a complex with an organic compound of aluminum, boron, beryllium or zinc, and (c) a hydrocarbyloxy group-containing compound represented by the formula $R''_qM^m(OR''')_n$. wherein R and R' are the same or different and are selected from alkyl, cycloalkyl, aryl and aralkyl groups having from 1 to 20 carbon atoms, R" is a hydrogen atom or a hydrocarbyl group selected from alkyl, alkyenyl, aryl or aralkyl groups having from 1 to 20 carbon atoms, R''' is a hydrocarbyl group having from 1 to 20 carbon atoms and selected from alkyl, alkenyl, aryl, or aralkyl groups, M is selected from silicon, carbon, phosphorous, boron or aluminum, m is the valence of M and $m > q \geq 0$, $m \geq n > 0$ and $n+q$ equal m, with II. a halogen-containing alcohol.

13. The reaction product in accordance with claim 12 wherein the contact product is performed at a temperature at a range of about $-20°$ C. to about 150° C. for about 0.1 to about 100 hours and the molar ratio of components (a), (b) and (c) is (b)/(a)=0.01 to 10, (c)/(a)=0.01 to 10 and (c)/(b)=0.1 to 10.

14. The reaction product in accordance with claim 12 wherein the components (a), (b) and (c) are contacted with one another in the order selected from (1) component (a) and component (b) are contacted with each other and the resulting contact product is contacted with component (c), (2) component (a) and component (c) are contacted with each other and the resulting contact product is contacted with component (b), (3) component (b) and component (c) are contacted with each other and the resulting contact product is contacted with component (a), (4) component (a), component (b) and component (c) are contacted with one another simultaneously.

15. The reaction product in accordance with claim 14 wherein the contacting is accomplished by mixing and stirring or mechanically copoluverizing.

16. The reaction product in accordance with claim 12 wherein component (a) is SiO$_2$, component (b) is butyl ethyl magnesium and component (c) is Si(OC$_2$H$_5$)$_4$.

17. A titanium containing supported catalyst component comprising the product obtained by obtained by contacting together (1) the reaction product comprising
(a) SiO$_2$,
(b) n-butyl ethyl magnesium, and
(c) Si(OC$_2$H$_5$)$_4$, with (2)
(d) 2,2,2-trichloroethanol,
(3)
(e) di-n-butylphthalate, and
(4)
(f) titanium tetrachloride.

18. A catalyst system for the polymerization of olefins comprising (I) a titanium containing supported catalyst component comprising the product obtained by contacting:

(1) the reaction product obtained by contacting together
(a) a metal oxide or a composite of metal oxides of Group IIA, IIB, IIIA, IIIB, IVA or IVB of the Periodic Table,
(b) a dihydrocarbyl magnesium compound represented by the formula RMgR', mixtures thereof or a complex with an organic compound of aluminum, boron, beryllium or zinc, and
(c) a hydrocarbyloxy group-containing compound represented by the formula $R''_qM^m(OR''')_n$, (2)
(d) a halogen-containing alcohol,
(3)
(e) an electron-donating compound, and
(4)
(f) a di-, tri-, or tetravalent titanium compound, wherein R and R' are the same or different and are selected from alkyl, cycloalkyl, aryl and aralkyl groups having from 1 to 20 carbon atoms, R" is a hydrogen atom or a hydrocarbyl group selected from alkyl, alkenyl, aryl or aralkyl groups having from 1 to 20 carbon atoms, R''' is a hydrocarbyl group having from 1 to 20 carbon atoms and selected from alkyl, alkenyl, aryl, or aralkyl groups, M is selected from silicon, carbon, phosphorous, boron or aluminum, m is the valence of M and $m > q \geq 0$, $m \geq n > 0$ and $n+q$ equal m; and (II) an organometallic compound of a metal of Groups I-III of the Periodic Table.

19. The catalyst system for the polymerization of olefins in accordance with claim 18 wherein the organometallic compound is an organoaluminum compound represented by the formula $R''_mAlX_{3-m}$ wherein R" is an alkyl or aryl group having from 1 to 18 carbon atoms, X is halogen and m is a number from 1 to 3.

* * * * *